US011955738B2

(12) United States Patent
Shao et al.

(10) Patent No.: US 11,955,738 B2
(45) Date of Patent: Apr. 9, 2024

(54) ANTENNA

(71) Applicant: HUAWEI TECHNOLOGIES CO., LTD., Guangdong (CN)

(72) Inventors: Jinjin Shao, Wuhan (CN); Zhongyang Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 553 days.

(21) Appl. No.: 17/155,761

(22) Filed: Jan. 22, 2021

(65) Prior Publication Data

US 2021/0143552 A1 May 13, 2021

Related U.S. Application Data

(63) Continuation of application No. PCT/CN2018/099115, filed on Aug. 7, 2018.

(51) Int. Cl.
*H01Q 9/42* (2006.01)
*H01Q 5/371* (2015.01)
*H01Q 11/14* (2006.01)

(52) U.S. Cl.
CPC ............... *H01Q 9/42* (2013.01); *H01Q 5/371* (2015.01); *H01Q 11/14* (2013.01)

(58) Field of Classification Search
CPC ............ H01Q 9/285; H01Q 3/44; H01Q 5/49; H01Q 19/30; H01Q 1/523; H01Q 9/16; H01Q 21/065
See application file for complete search history.

(56) References Cited

U.S. PATENT DOCUMENTS 5,986,609 A * 11/1999 Spall ........................ H01Q 1/38 343/702
6,025,811 A * 2/2000 Canora .................... H01Q 1/38 343/822
7,023,909 B1 * 4/2006 Adams ................ H01Q 1/2275 343/907
7,298,343 B2 * 11/2007 Forster ............ G06K 19/07796 343/700 MS (Continued)

FOREIGN PATENT DOCUMENTS

CN 1825704 A 8/2006
CN 101188325 A 5/2008

(Continued)

OTHER PUBLICATIONS

Extended European Search Report issued in European Application No. 18929346.7 dated Jun. 2, 2021, 9 pages.

(Continued)

*Primary Examiner* — Ricardo I Magallanes
(74) *Attorney, Agent, or Firm* — Fish & Richardson P.C.

(57) ABSTRACT

The present disclosure relates to antenna. One example antenna includes a radiating element, a reflecting element, and a radio frequency coaxial cable. The radiating element and the reflecting element are located on a same plane, and the radiating element is connected to the radio frequency coaxial cable. The reflecting element is of a comb structure, the comb structure includes at least two comb teeth, sizes of all the comb teeth are the same, intervals between every two adjacent comb teeth are the same, and a comb-like opening face of the reflecting element is opposite to the radiating element.

20 Claims, 10 Drawing Sheets

(56) References Cited

U.S. PATENT DOCUMENTS

| | | | | |
|---|---|---|---|---|
| 8,022,887 | B1 * | 9/2011 | Zarnaghi | H01Q 1/38 343/846 |
| 8,476,991 | B2 * | 7/2013 | Goto | H03H 9/6496 333/195 |
| 8,558,748 | B2 * | 10/2013 | Chen | H01Q 5/49 343/822 |
| 8,947,236 | B2 * | 2/2015 | Forster | G06K 19/077 340/539.22 |
| 9,257,741 | B2 | 2/2016 | Cheng | |
| 11,418,223 | B2 * | 8/2022 | Hsieh | H04B 1/0057 |
| 2005/0104781 | A1 * | 5/2005 | Notohara | H01Q 7/00 343/700 MS |
| 2006/0001572 | A1 * | 1/2006 | Gaucher | H01Q 9/26 343/700 MS |
| 2007/0063056 | A1 * | 3/2007 | Gaucher | H01L 24/73 257/679 |
| 2008/0272976 | A1 * | 11/2008 | Kitamori | H01Q 19/30 343/793 |
| 2012/0293387 | A1 * | 11/2012 | Ohno | H01Q 19/30 343/818 |
| 2013/0069837 | A1 * | 3/2013 | Cozzolino | H01Q 13/10 343/727 |
| 2013/0120209 | A1 * | 5/2013 | Mak | H01Q 19/30 343/819 |
| 2013/0300624 | A1 * | 11/2013 | Fakharzadeh Jahromi | H01Q 9/065 343/793 |
| 2015/0042533 | A1 * | 2/2015 | Cheng | H01Q 1/36 343/817 |
| 2017/0222306 | A1 * | 8/2017 | Biscontini | H01Q 21/26 |
| 2018/0316097 | A1 * | 11/2018 | Wium | H01Q 21/062 |
| 2019/0393594 | A1 * | 12/2019 | Huang | H01Q 9/285 |
| 2020/0388906 | A1 * | 12/2020 | Kim | H01Q 1/243 |
| 2022/0294116 | A1 * | 9/2022 | Yang | H01Q 9/065 |
| 2022/0352645 | A1 * | 11/2022 | Shao | H01Q 21/28 |
| 2023/0020807 | A1 * | 1/2023 | Shao | H01Q 5/48 |

FOREIGN PATENT DOCUMENTS

| | | | | | |
|---|---|---|---|---|---|
| CN | 101394023 | A | | 3/2009 | |
| CN | 102931481 | A | | 2/2013 | |
| CN | 102931481 | B | * | 9/2014 | H01Q 1/38 |
| CN | 104577308 | A | | 4/2015 | |
| CN | 105655720 | A | | 6/2016 | |
| CN | 106099386 | A | | 11/2016 | |
| CN | 206673097 | U | | 11/2017 | |
| EP | 2824762 | A1 | * | 1/2015 | H01Q 1/2216 |
| JP | 2621331 | B2 | | 6/1997 | |
| JP | 2009194670 | A | | 8/2009 | |
| JP | 4769827 | B2 | * | 9/2011 | H01Q 9/26 |
| JP | 5885014 | B2 | | 3/2016 | |
| KR | 20140102974 | A | | 8/2014 | |
| RU | 2369418 | C1 | | 10/2009 | |
| WO | 2011154954 | A2 | | 12/2011 | |

OTHER PUBLICATIONS

Office Action issued in Chinese Application No. 201880092866.6 dated May 7, 2021, 18 pages (with English translation).

PCT International Search Report and Written Opinion issued in International Application No. PCT/CN2018/099115 dated Apr. 16, 2019, 19 pages (with English translation).

Office Action issued in Chinese Application No. 201880092866.6 dated Jan. 19, 2022, 6 pages (with English translation).

* cited by examiner

ANTENNA

CROSS-REFERENCE TO RELATED APPLICATIONS

This application is a continuation of International Application No. PCT/CN2018/099115, filed on Aug. 7, 2018, the disclosure of which is hereby incorporated by reference in its entirety.

TECHNICAL FIELD

This application relates to the communications field, and in particular, to an antenna.

BACKGROUND

With increasingly high requirements for quality of life and home aesthetics, more wireless fidelity (Wi-Fi) products, of home terminals, with built-in antennas are available, and a conventional product with a high-performance external antenna cannot meet a requirement for an existing product form due to constraints of a size and a structure. However, a product with a built-in antenna has increasing requirements for space and size in many cases due to constantly enriched internal structures and functional modules. In other words, space reserved for an antenna module and a single component is becoming smaller. Therefore, it is crucial to design a small-sized built-in wall-mounted antenna. Due to a size limitation, most built-in wall-mounted antennas are half-wave dipoles or inverted-F antennas (IFA), and a full-space coverage effect is achieved by combining a plurality of antennas.

It is almost impossible for an existing external antenna to be built-in, even for a small external 2 dBi antenna. To adapt to the existing product form, both a small built-in 1 dBi antenna and a built-in high-gain antenna need to be constrained by a small size. Compared with an external antenna, a built-in antenna has a large difference in gain. A Wi-Fi product using the built-in antenna cannot compete with that using the external antenna in long-distance coverage. To implement Wi-Fi performance of a competitive built-in product, a built-in antenna with a small size, low costs, and a high gain needs to be designed, to improve the performance of the built-in product and implement a better Wi-Fi feature.

SUMMARY

Embodiments of this application provide an antenna, configured to increase a phase difference through a multiple reflection effect of a reflecting element, and shorten a spatial distance of a quarter wavelength required by the reflecting element to complete coherent superposition, to effectively enhance a directional radiation capability of the antenna in a small size, and eliminate an impact of energy cancellation in a close coupling case.

In view of this, a first aspect of embodiments of this application provides an antenna which may include a radiating element, a reflecting element, and a radio frequency coaxial cable. The radiating element and the reflecting element are located on a same plane, and the radiating element is connected to the radio frequency coaxial cable. The reflecting element is of a comb structure, and the comb structure may also be referred to as a saw tooth structure. The comb structure includes at least two comb teeth, sizes of all the comb teeth are the same, intervals between every two adjacent comb teeth are the same, and a comb-like opening face of the reflecting element is opposite to the radiating element. The radio frequency coaxial cable is configured to receive a radio frequency signal. The radiating element is configured to radiate the radio frequency signal, to obtain a first radiation signal and a second radiation signal, and the first radiation signal and the second radiation signal have different directions. The first radiation signal is reflected by the at least two comb teeth, to obtain a reflection signal, and a direction of the reflection signal is the same as the direction of the second radiation signal. The second radiation signal is coherently superimposed with the reflection signal, to output a superimposed signal.

Because the reflecting element in the antenna provided in the embodiments of this application is of the comb structure, and the comb structure includes the at least two comb teeth, the reflecting element may reflect the first radiation signal radiated by the radiating element. An obtained reflection signal is coherently superimposed with the second radiation signal radiated by the radiating element, to output the superimposed signal. In other words, the antenna increases a phase difference through a multiple reflection effect of the reflecting element, and shortens a spatial distance of a quarter wavelength required by the reflecting element to complete coherent superposition. This effectively enhances a directional radiation capability of the antenna in a small size, and eliminates an impact of energy cancellation in a close coupling case.

Optionally, in some embodiments of this application, every two adjacent comb teeth have a same length and a same width. The length and the width of the comb teeth of the reflecting element are described, so that technical solutions of this application are more specific.

Optionally, in some embodiments of this application, a width of each comb tooth ranges from $\lambda/20$ to $\lambda/8$, and an interval between the radiating element and the reflecting element ranges from $\lambda/20$ to $\lambda/8$, where $\lambda$ is a wavelength of the radio frequency signal. In the embodiments of this application, the range of the width of each comb tooth in the reflecting element and the range of the interval between the radiating element and the reflecting element are further described, and an interval range is provided, to compensate for a path phase $\Theta$ reduced by shortening a distance between the radiating element and the reflecting element.

Optionally, in some embodiments of this application, a phase of the superimposed signal is $2n\pi$, where $2n\pi=\pi+2\times d\times(2\pi/\lambda)+\Theta$, n is an integer greater than 0, d is the interval between the reflecting element and the radiating element, and $\Theta$ is a compensation phase generated by the comb structure. In this application, the comb structure is innovatively introduced and is loaded on a designed printed conductor to serve as the reflecting element, to implement a 180-degree phase jump greater than a perfect electric conductor (PEC), thereby ensuring that a phase effect of $2n\pi$ is achieved when a spatial propagation path is less than a quarter wavelength. In this way, superimposition of a main radiation wave and a reflection wave on an equiphasic plane finally presents a horizontal directional radiation property.

Optionally, in some embodiments of this application, the radiating element includes a via, and the radio frequency coaxial cable passes through the radiating element through the via. In other words, the radio frequency coaxial cable is connected to the radiating element through the via.

Optionally, in some embodiments of this application, the radio frequency coaxial cable perpendicularly passes through the radiating element through the via. To implement barrier-free feeding, antenna excitation may be implemented in an orthogonal layout manner, to be specific, the radio frequency coaxial cable is perpendicular to a plane on which the antenna is located, and feeds the radiating element by passing through the via. In other words, via guidance is used to implement orthogonal layout of the feeding radio frequency coaxial cable and the antenna, and reduce an impact of the radio frequency coaxial cable on radiation performance of the antenna, thereby facilitating an integration of a built-in antenna.

Optionally, in some embodiments of this application, the radiating element includes an upper radiation arm, a lower radiation arm, and a balun. The upper radiation arm and the lower radiation arm form an L-shaped longitudinal cabling structure or a local snake-shaped structure, and the upper radiation arm and the lower radiation arm are connected to the balun. In the embodiments, a structure of the radiating element is described.

Optionally, in some embodiments of this application, the upper radiation arm and the lower radiation arm are symmetrically connected to the balun. Further, for a high-gain antenna implemented with a symmetrical architecture design, a symmetrical balun design avoids a radiation problem caused by an asymmetrical layout, and weakens an unbalance impact of a balun structure on an antenna radiating element. To be specific, the symmetrical balun design with a small circuit size and a compact layout is used, to reduce a radiation impact of the balun, and balance a coupling effect between the balun and the upper radiation arm and the lower radiation arm in the antenna radiating element, thereby ensuring a symmetrical radiation effect of the antenna.

Optionally, in some embodiments of this application, shapes of the upper radiation arm and the lower radiation arm are symmetrical or asymmetrical. The shapes of the upper radiation arm and the lower radiation arm in the radiating element are further described.

Optionally, in some embodiments of this application, the via is located in an upper radiation arm or a lower radiation arm. In other words, the via may be located in the upper radiation arm or the lower radiation arm in the radiating element.

Optionally, in some embodiments of this application, if the via is located in the upper radiation arm, the radio frequency coaxial cable includes an inner conductor, an outer conductor, and an insulating medium. The outer conductor passes through the via and is connected to the upper radiation arm, and the inner conductor and the insulating medium pass through the via and are bent. The inner conductor is connected to the upper radiation arm, and the insulating medium insulates the inner conductor from contacting the lower radiation arm. To be specific, the outer conductor passes through the via and is directly connected to the upper radiation arm in which the via is located, and the inner conductor and the insulating medium pass through the via and are bent upwards. The inner conductor is connected to the upper radiation arm, and the insulating medium insulates the inner conductor from the lower radiation arm, to reduce short circuit risks.

Optionally, in some embodiments of this application, the radiating element and the reflecting element are carried on a dielectric plate, to form an integrally formed structure. It may be understood that the dielectric plate may be a printed circuit board (PCB) or the like.

Optionally, in some embodiments of this application, if the radiating element is made of a metal material, the reflecting element is carried on a dielectric plate. If the reflecting element is made of a metal material, the radiating element is carried on a dielectric plate. To be specific, to reduce an occupied area of the PCB board and implement a more flexible installation mode, it is also preferable to combine partial PCB printing and a metal material.

Optionally, in some embodiments of this application, the reflecting element is carried on a circuit board, the radiating element is carried on a dielectric plate, and the reflecting element and the radiating element are connected through installation. The reflecting element may be directly printed on an edge of the circuit board, and the radiating element is made of another small piece of PCB. The two parts are installed according to an overall design requirement, to implement effective directional radiation. Further, to better ensure a function of the reflecting element, the reflecting element on the circuit board may be independently printed and electrically isolated from a copper-clad area on a main board.

The technical solutions provided in the embodiments of this application have the following beneficial effects:

The antenna in this application may include the radiating element, the reflecting element, and the radio frequency coaxial cable. The radiating element and the reflecting element are located on the same plane, and the radiating element is connected to the radio frequency coaxial cable. The reflecting element is of the comb structure, the comb structure includes the at least two comb teeth, the sizes of all the comb teeth are the same, the intervals between every two adjacent comb teeth are the same, and the comb-like opening face of the reflecting element is opposite to the radiating element. The radio frequency coaxial cable is configured to receive the radio frequency signal. The radiating element is configured to radiate the radio frequency signal, to obtain the first radiation signal and the second radiation signal, and the first radiation signal and the second radiation signal have the different directions. The first radiation signal is reflected by the at least two comb teeth, to obtain the reflection signal, and the direction of the reflection signal is the same as the direction of the second radiation signal. The second radiation signal is coherently superimposed with the reflection signal, to output the superimposed signal. Because the reflecting element in the antenna provided in the embodiments of this application is of the comb structure, and the comb structure includes the at least two comb teeth, the reflecting element may reflect the first radiation signal radiated by the radiating element. The obtained reflection signal is coherently superimposed with the second radiation signal radiated by the radiating element, to output the superimposed signal. In other words, the antenna increases the phase difference through the multiple reflection effect of the reflecting element, and shortens the spatial distance of a quarter wavelength required by the reflecting element to complete coherent superposition. This effectively enhances the directional radiation capability of the antenna in the small size, and eliminates the impact of energy cancellation in a close coupling case.

DESCRIPTION OF EMBODIMENTS

The following describes the technical solutions in the embodiments of this application with reference to the accompanying drawings in the embodiments of this application. Apparently, the described embodiments are merely a part rather than all of the embodiments of this application. All other embodiments obtained by a person skilled in the art based on the embodiments of this application without creative efforts shall fall within the protection scope of this application.

In an implementation, if a wall-mounted antenna uses an asymmetrical balun design, current distribution on two radiation arms of a dipole is uneven to some extent. In addition, a mutual coupling effect between a balun and the radiation arm on one side also causes distribution of spatial radiation of the antenna to be asymmetrical to some extent. In a design in which a reflecting element is directly used to implement directional radiation, to achieve an effect of coherent superposition, a phase difference of $2n\pi$, namely, a phase difference of a quarter wavelength on a space propagation path, is required between a main radiation wave and a reflection wave. For a 2.4G frequency, the space propagation path needs to be about 30 mm, which exceeds a design specification of an existing wall-mounted antenna. Therefore, the space propagation path cannot be integrated into an optical network termination (ONT) product.

Figure 1:
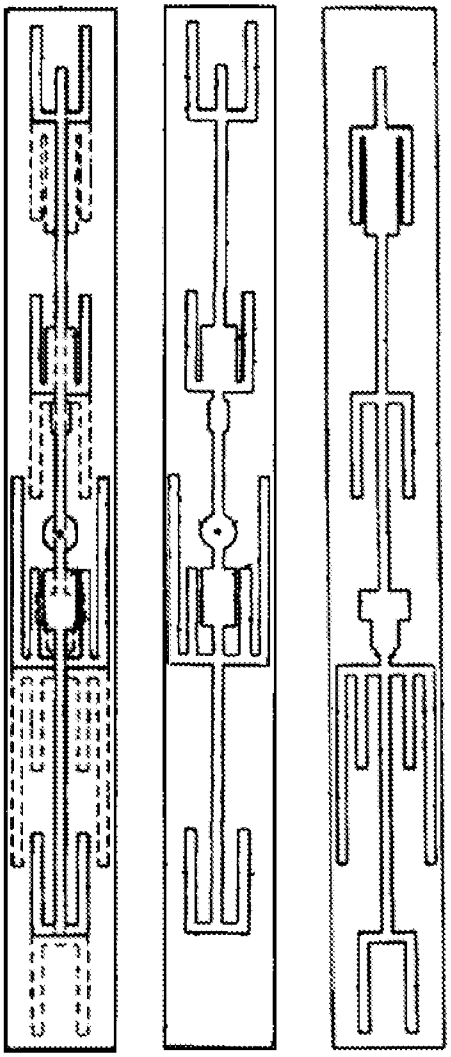
FIG. 1 (Prior Art)
FIG. 1 is a schematic diagram of an array antenna in the prior art.

In another implementation, an array antenna design is a main design for meeting a high-gain requirement, and an array antenna is usually used as an external antenna. The array antenna is mainly characterized in that in a perpendicular direction, a plurality of array units are combined to achieve a high gain on a horizontal plane. Although this design does not increase a width requirement, a feeding network is complex. Using a larger dielectric plate also increases loss and reduces efficiency. In addition, a size of a vertical dimension also increases exponentially. To meet a gain requirement of 5 dBi, a length of the array antenna can be at least 100 mm, which cannot be used in a built-in product. FIG. 1 is a schematic diagram of an array antenna. In this implementation, a printed array antenna occupies a very large area, which increases a dielectric loss, reduces radiation efficiency, and makes costs much higher than those of a small-sized printed antenna.

To implement a design of a small-sized high-gain built-in antenna, a conventional directional antenna design is not feasible. The conventional directional antenna has a large overall size and a complex feeding structure, so that the conventional directional antenna is difficult to be compatible with an existing small built-in antenna. Therefore, to implement directional radiation of an antenna in a small size is an important step to design a high-gain built-in antenna.

In technical solutions of this application, to implement the design of the small-sized high-gain built-in antenna, the reflecting element is used to coherently superpose a main radiation wave and a reflection wave, and a phase difference of a quarter wavelength on a space propagation path is required. For a 2.4G frequency, the space propagation path needs to be about 30 mm, which exceeds the design specification of the existing wall-mounted antenna. Therefore, the space propagation path cannot be integrated into an ONT product. To adapt to a product form and implement a design of a small-sized high-gain directional antenna, a conductor loaded with a comb structure may be used as a reflecting element. A multiple reflection effect of the comb structure increases a phase difference of a reflection signal and shortens a spatial distance of a quarter wavelength required by the reflecting element to complete coherent superposition. This effectively enhances a directional radiation capability of the antenna in a small size, and weakens an impact of energy cancellation in a close coupling case.

Figure 2A:
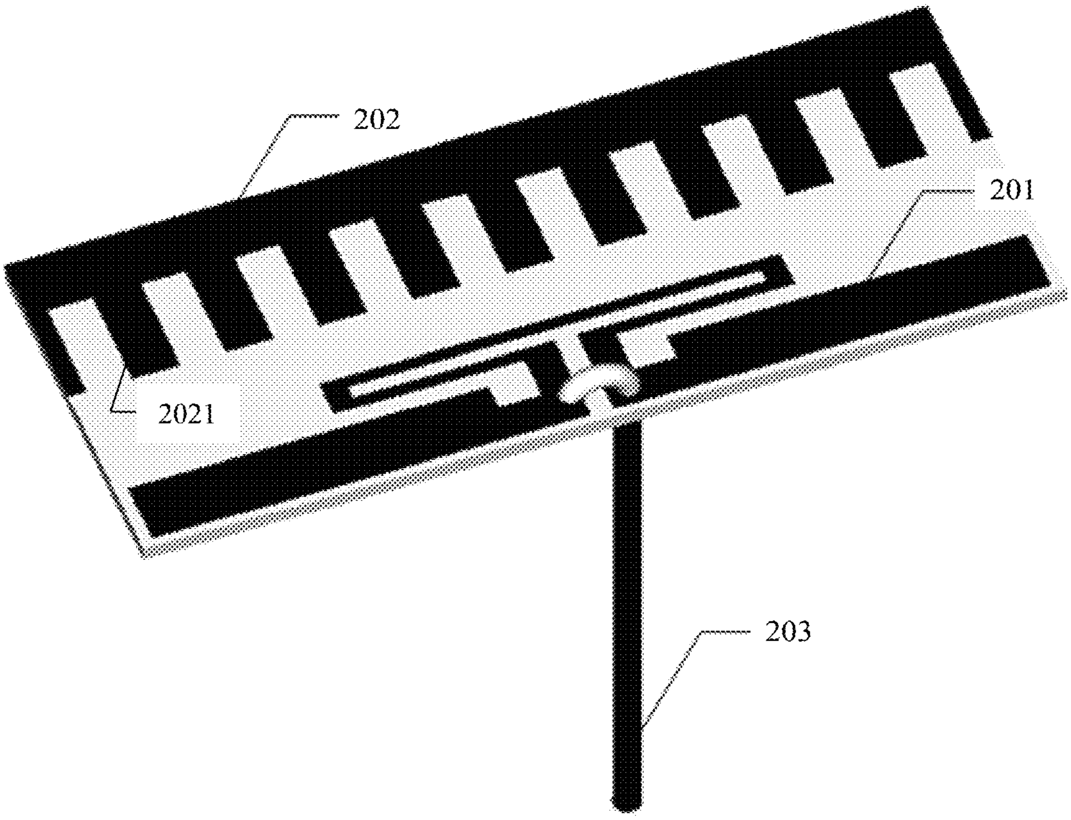
FIG. 2A is a schematic diagram of an antenna according to an embodiment of this application.

An embodiment of this application provides an antenna. FIG. 2A is a schematic diagram of the antenna according to the embodiment of this application. The antenna may include a radiating element 201, a reflecting element 202, and a radio frequency coaxial cable 203. The radiating element 201 and the reflecting element 202 are located on a same plane. It may be understood that the same plane herein may be a same dielectric plate, for example, a same printed circuit board. The radiating element 201 is connected to the radio frequency coaxial cable 203. The reflecting element 202 is of a comb structure, the comb structure includes at least two comb teeth 2021, sizes of all the comb teeth are the same, intervals between every two adjacent comb teeth are the same, and a comb-like opening face of the reflecting element 202 is opposite to the radiating element 201. The radio frequency coaxial cable 203 is configured to receive a radio frequency signal. The radiating element 201 is configured to radiate the radio frequency signal to obtain a first radiation signal and a second radiation signal, and the first radiation signal and the second radiation signal have different directions. The first radiation signal is reflected by the reflecting element 202, to be specific, the first radiation signal is reflected by the at least two comb teeth, to obtain a reflection signal, and a direction of the reflection signal is the same as the direction of the second radiation signal. The second radiation signal is coherently superimposed with the reflection signal, to output a superimposed signal.

Because the reflecting element 202 in the antenna provided in the embodiment of this application is of the comb structure, and the comb structure includes the at least two comb teeth 2021, the reflecting element may reflect the first radiation signal radiated by the radiating element 201. An obtained reflection signal is coherently superimposed with the second radiation signal radiated by the radiating element 201, to output the superimposed signal. In other words, the antenna increases a phase difference through a multiple reflection effect of the reflecting element 202, and shortens a spatial distance of a quarter wavelength required by the reflecting element 202 to complete coherent superposition. This effectively enhances a directional radiation capability of the antenna in a small size, and eliminates an impact of energy cancellation in a close coupling case. To be specific, in this application, the comb structure is innovatively introduced and is loaded on a designed printed conductor to serve as the reflecting element 202, to implement a 180-degree phase jump greater than a perfect electric conductor (PEC), thereby ensuring that a phase effect of 2nπ is achieved when a spatial propagation path is less than a quarter wavelength. In this way, superimposition of a main radiation wave and a reflection wave on an equiphasic plane finally presents a horizontal directional radiation property.

Figure 2B:
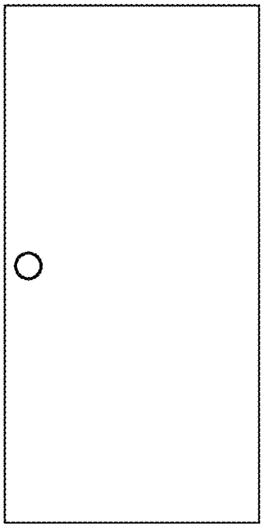
FIG. 2B is a rear view of an antenna according to an embodiment of this application.
Figure 2C:
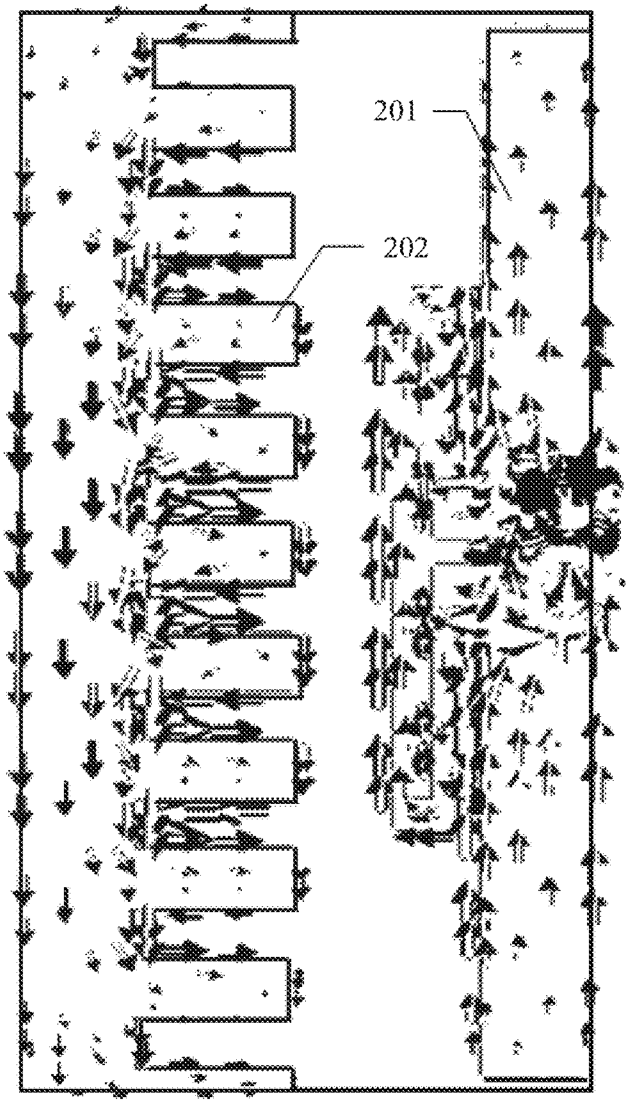
FIG. 2C is a distribution diagram of currents of an antenna according to an embodiment of this application.

For example, FIG. 2B is a rear view of the antenna according to the embodiment of this application. FIG. 2C is a distribution diagram of currents of the antenna according to the embodiment of this application.

Optionally, in some embodiments of this application, every two adjacent comb teeth have a same length and a same width. The length and the width of the comb teeth of the reflecting element 202 are described, so that the technical solutions of this application are more specific.

Optionally, in some embodiments of this application, a width of each comb tooth ranges from λ/20 to λ/8, and an interval between the radiating element 201 and the reflecting element 202 ranges from λ/20 to λ/8, where λ is a wavelength of the radio frequency signal. The range of the width of each comb tooth in the reflecting element and the range of the interval between the radiating element 201 and the reflecting element 202 are further described, and an interval range is provided, to compensate for a path phase Θ reduced by shortening a distance between the radiating element 201 and the reflecting element 202.

Optionally, in some embodiments of this application, a phase of the superimposed signal is 2nπ, where $2n\pi=\pi+2\times d\times(2\pi/\lambda)+\Theta$, n is an integer greater than 0, d is the interval between the reflecting element 202 and the radiating element 201, and Θ is a compensation phase generated by the comb structure.

In other words, the length and the width of the at least two comb teeth, and the interval between the radiating element 201 and the reflecting element 202 may be adjusted to implement required phase masses of different reflection surfaces. In this way, similar characteristics meeting 2nπ are constructed on different frequency bands.

Figure 3A:
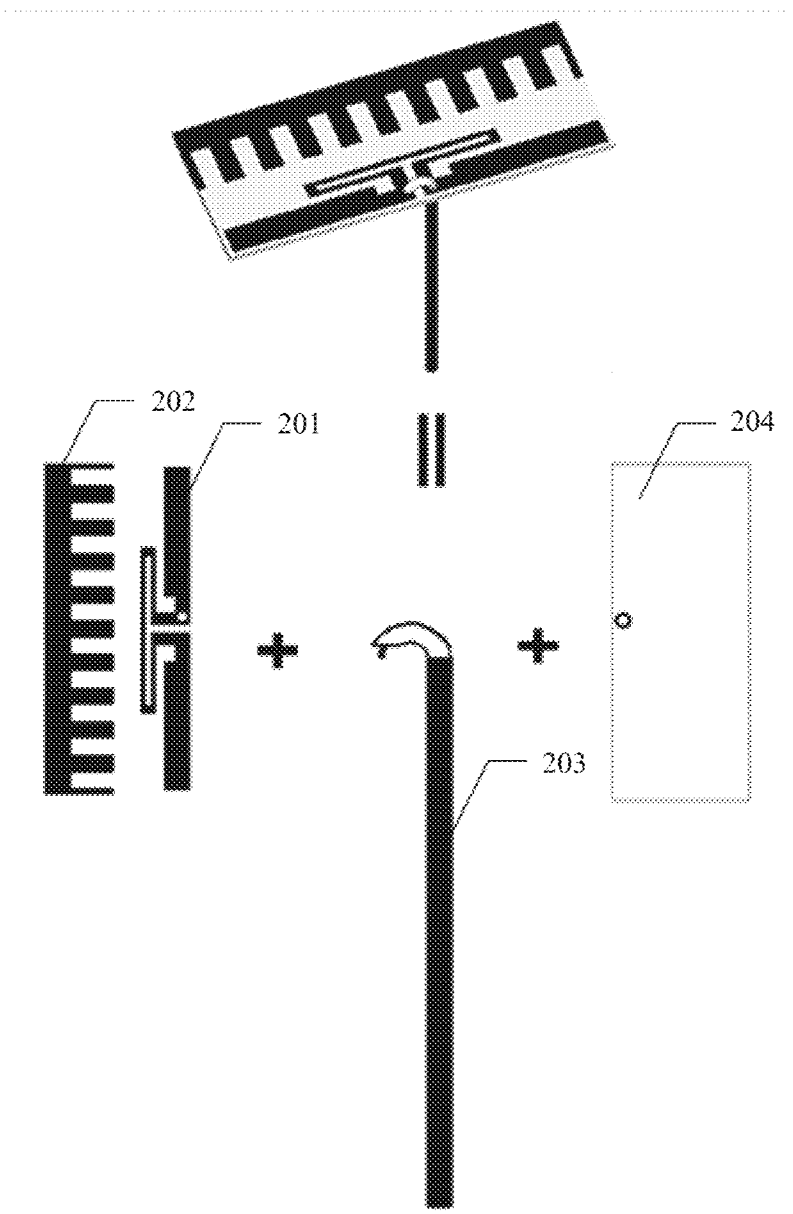
FIG. 3A is another schematic diagram of an antenna according to an embodiment of this application.

Optionally, in some embodiments of this application, the radiating element 201 includes a via 2011, and the radio frequency coaxial cable 203 passes through the radiating element 201 through the via 2011. In other words, the radio frequency coaxial cable 203 is connected to the radiating element 201 through the via 2011. FIG. 3A is another schematic diagram of an antenna according to the embodiment of this application. As shown in FIG. 3A, the radiating element 201 and the reflecting element 202 are carried on a dielectric plate 204.

Optionally, in some embodiments of this application, the radio frequency coaxial cable 203 perpendicularly passes through the radiating element 201 through the via 2011. Because the radiating element 201 is relatively close to the reflecting element 202, a surface current distribution and a coupling effect of the radiating element 201 and the reflecting element 202 are very strong. In this case, introduction of any other conductor element may cause a very great impact, especially on a feeding area. Therefore, to implement barrier-free feeding, antenna excitation may be implemented in an orthogonal layout manner, to be specific, the radio frequency coaxial cable 203 is perpendicular to a plane on which the antenna is located, and feeds the radiating element 201 by passing through the via 2011. In other words, via 2011 guidance is used to implement orthogonal layout of the feeding radio frequency coaxial cable 203 and the antenna, and to reduce an impact of the radio frequency coaxial cable on radiation performance of the antenna, thereby facilitating an integration of a built-in antenna.

Figure 3B:
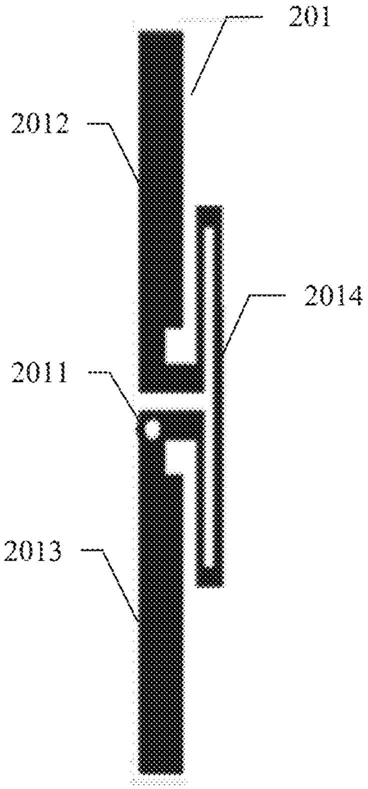
FIG. 3B is a schematic diagram of a radiating element according to an embodiment of this application.

Optionally, in some embodiments of this application, the radiating element 201 includes an upper radiation arm 2012, a lower radiation arm 2013, and a balun 2014. The upper radiation arm 2012 and the lower radiation arm 2013 form an L-shaped longitudinal cabling structure or a local snake-shaped structure, and the upper radiation arm 2012 and the lower radiation arm 2013 are connected to the balun 2014. In this embodiment, the structure of the radiating element 201 is described. FIG. 3B is a schematic diagram of the radiating element.

Optionally, in some embodiments of this application, the upper radiation arm 2012 and the lower radiation arm 2013 are symmetrically connected to the balun 2014. Further, for a high-gain antenna implemented with a symmetrical architecture design, a symmetrical balun 2014 design avoids a radiation problem caused by an asymmetrical layout, and weakens an unbalance impact of a balun 2014 structure on the antenna radiating element 201. To be specific, the symmetrical balun 2014 design with a small circuit size and a compact layout is used, to reduce a radiation impact of the balun 2014, and balance a coupling effect between the balun 2014 and the upper radiation arm 2012 and the lower radiation arm 2013 in the antenna radiating element 201, thereby ensuring a symmetrical radiation effect of the antenna.

Figure 3C:
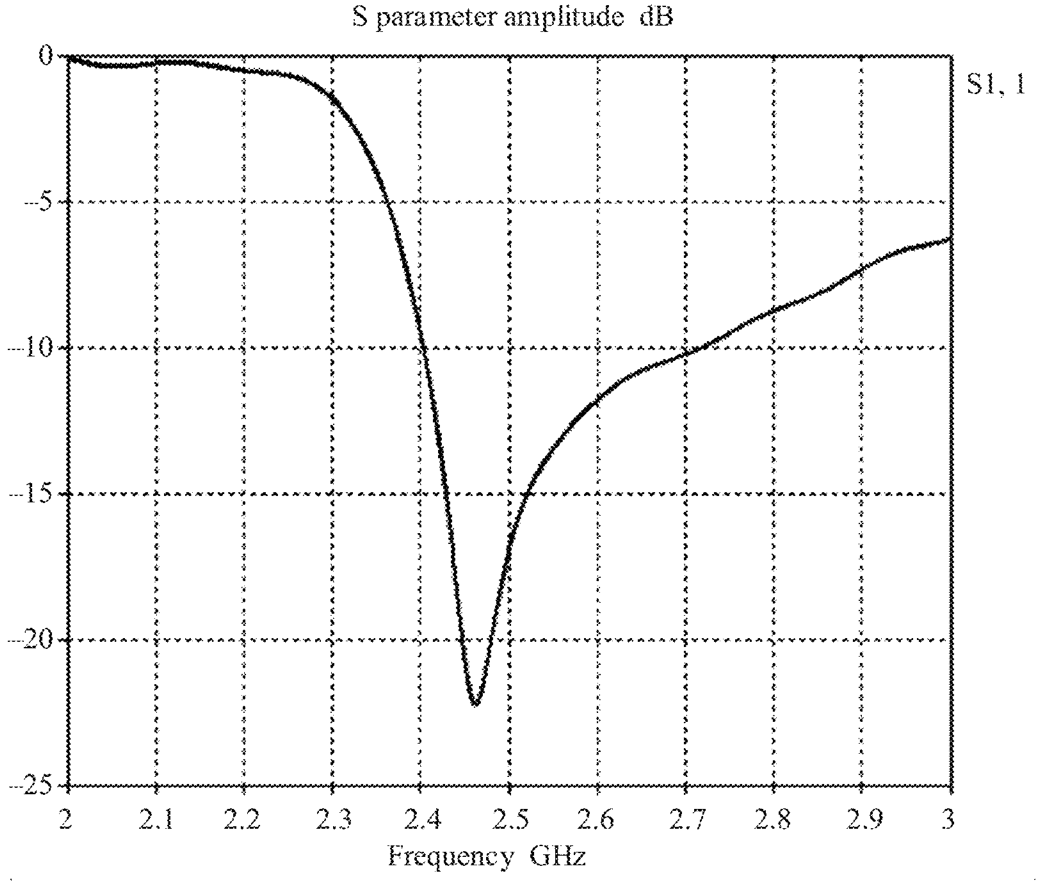
FIG. 3C is a schematic diagram of a return loss curve of a high-gain directional antenna.
Figure 3D:
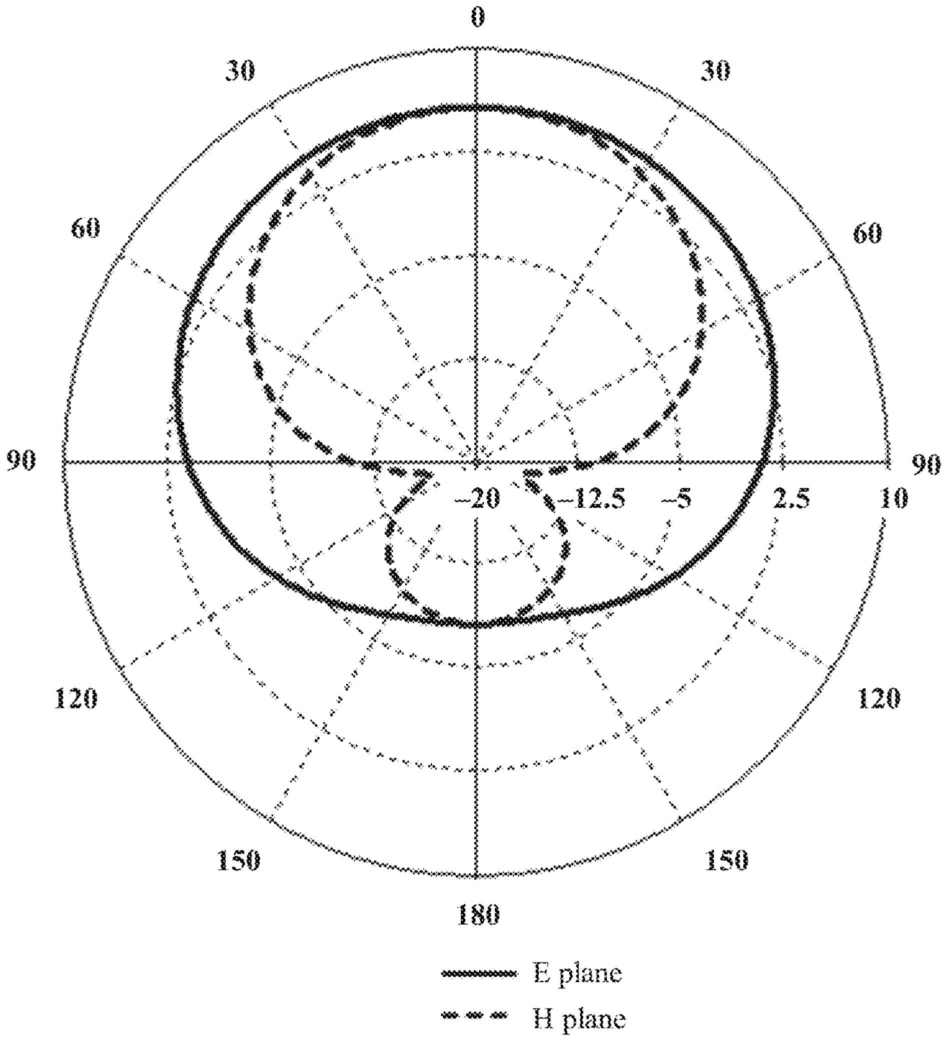
FIG. 3D is a direction diagram of two radiation planes of a high-gain directional antenna on an E plane and an H plane at a center frequency.

FIG. 3C is a schematic diagram of a return loss curve of a high-gain directional antenna. FIG. 3C shows the return loss curve of the high-gain directional antenna used in a Wi-Fi product. The antenna has an excellent resonance characteristic, and has a bandwidth covering a frequency band of 2.4G to 2.7G which can meet a Wi-Fi frequency band range required by 2.4G. FIG. 3D is a direction diagram of two radiation planes of the high-gain directional antenna on an E plane and an H plane at a center frequency. The antenna has a good directional radiation property. A maximum radiation direction points to theta=0, namely, a normal direction of a dipole. A gain in a 0-degree direction is greater than or close to 5 dBi, which may match a maximum gain of an external antenna. In addition, a beam width reaches 120 degrees, which may meet a wide angle coverage in a specific direction.

Optionally, in some embodiments of this application, shapes of the upper radiation arm 2012 and the lower radiation arm 2013 are symmetrical or asymmetrical. The shapes of the upper radiation arm 2012 and the lower radiation arm 2013 in the radiating element 201 are further described.

Optionally, in some embodiments of this application, the via 2011 is located in the upper radiation arm 2012 or the lower radiation arm 2013. In other words, the via 2011 may be located in the upper radiation arm 2012 or the lower radiation arm 2013 in the radiating element 201.

Optionally, in some embodiments of this application, if the via 2011 is located in the upper radiation arm 2012, the radio frequency coaxial cable 203 includes an inner conductor, an outer conductor, and an insulating medium. The outer conductor passes through the via 2011 and is connected to the upper radiation arm 2012, and the inner conductor and the insulating medium pass through the via 2011 and are bent. The inner conductor is connected to the upper radiation arm 2012, and the insulating medium insulates the inner conductor from contacting the lower radiation arm 2013. To be specific, the outer conductor passes through the via 2011 and is directly connected to the upper radiation arm 2012 in which the via 2011 is located, and the inner conductor and the insulating medium pass through the via 2011 and are bent upwards. The inner conductor is connected to the upper radiation arm 2012, and the insulating medium insulates the inner conductor from the lower radiation arm 2013, to reduce short circuit risks.

If the via 2011 is located in the lower radiation arm 2013, the radio frequency coaxial cable 203 includes an inner conductor, an outer conductor, and an insulating medium. The outer conductor passes through the via 2011 and is connected to the lower radiation arm 2013, and the inner conductor and the insulation medium pass through the via 2011 and are bent. The inner conductor is connected to the lower radiation arm 2013, and the insulating medium insulates the inner conductor from contacting the upper radiation arm 2012.

Optionally, in some embodiments of this application, the radiating element 201 and the reflecting element 202 are carried on a dielectric plate, to form an integrally formed structure. That is, the embodiment of this application further describes the antenna. Both the radiating element 201 and the reflecting element 202 included in the antenna are carried on the dielectric plate, to form the integrally formed structure. It may be understood that the dielectric plate may be a printed circuit board (PCB) or the like.

Figure 4A:
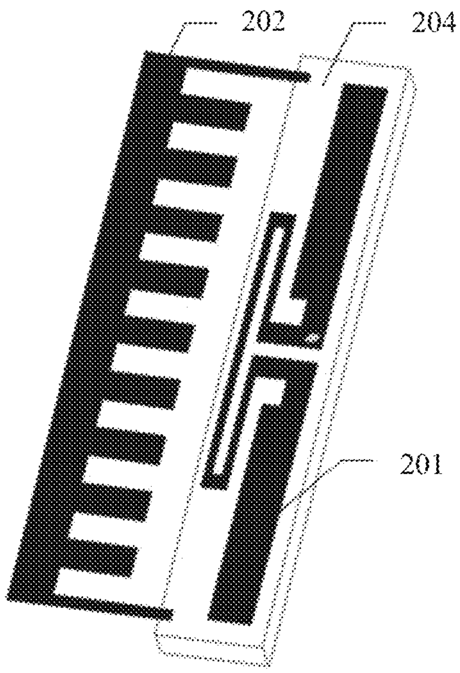
FIG. 4A is another schematic diagram of an antenna according to an embodiment of this application.

Optionally, in some embodiments of this application, if the radiating element 201 is made of a metal material, the reflecting element 202 is carried on the dielectric plate. If the reflecting element 202 is made of a metal material, the radiating element 201 is carried on the dielectric plate 204. FIG. 4A is another schematic diagram of the antenna according to the embodiment of this application.

To be specific, to reduce an occupied area of the PCB board and implement a more flexible installation mode, it is also preferable to combine partial PCB printing and a metal material. FIG. 4A shows an antenna structure based on a combination idea. For example, the reflecting element 202 is made of a metal material, and the radiating element 201 is in a PCB printed form; or, the reflecting element 202 may be in a PCB printed form, and the radiating element 201 is made of a metal material.

Figure 4B:
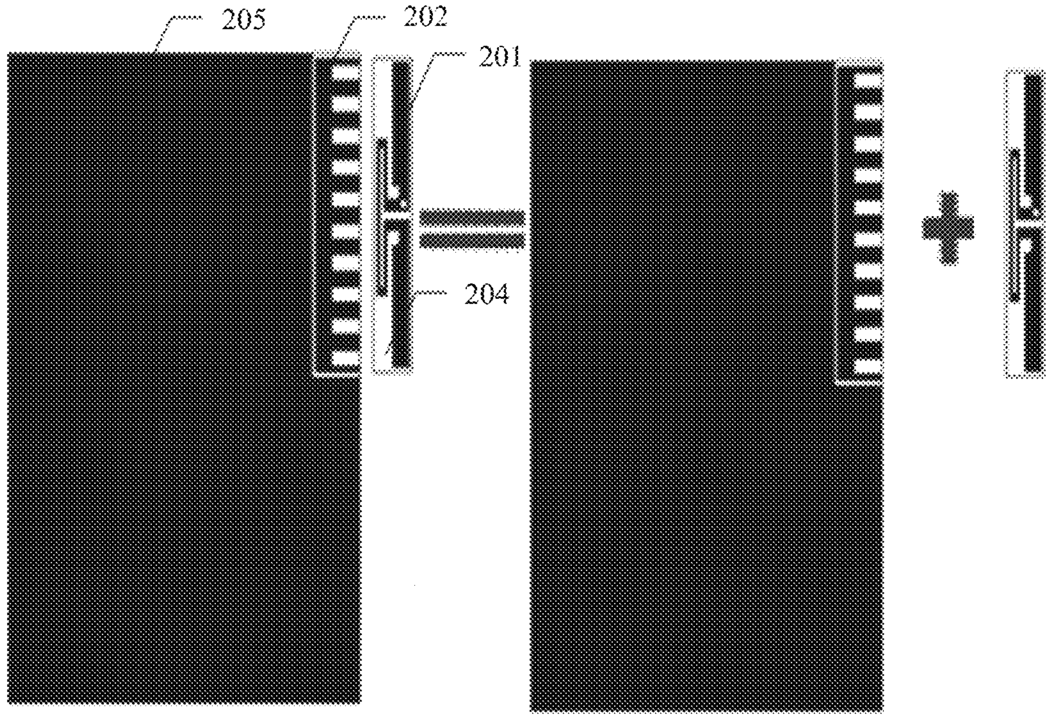
FIG. 4B is another schematic diagram of an antenna according to an embodiment of this application.

Optionally, in some embodiments of this application, the reflecting element 202 is carried on a circuit board 205, the radiating element 201 is carried on the dielectric plate 204, and the reflecting element 202 and the radiating element 201 are connected through installation. The antenna in this application is mainly applied to a built-in ONT product, and is placed close to the circuit board and is located on an edge of a main board. Therefore, a new antenna form may be completed by using the main board. FIG. 4B is another schematic diagram of the antenna according to the embodiment of this application. The reflecting element 202 may be directly printed on an edge of the circuit board, and the radiating element 201 is made of another small piece of PCB. The two parts are installed according to an overall design requirement, to implement effective directional radiation. Further, to better ensure a function of the reflecting element 202, the reflecting element 202 on the circuit board may be independently printed and electrically isolated from a copper-clad area on the main board.

Figure 4C:
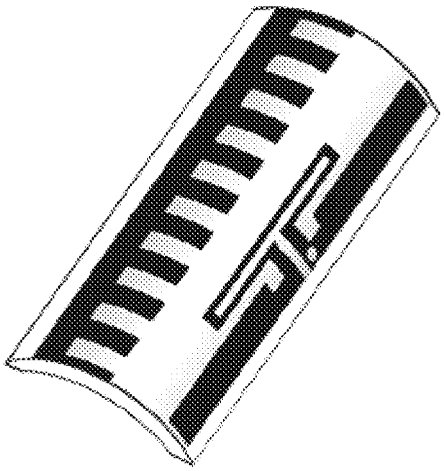
FIG. 4C is another schematic diagram of an antenna according to an embodiment of this application.

Optionally, in some embodiments of this application, in addition to being directly printed on a PCB main board or being used together with a PCB sub-board, the antenna can be designed on a mechanical part by using a spraying-like process. FIG. 4C is another schematic diagram of the antenna according to the embodiment of this application. A conformal antenna is located on a surface of a cylindrical mechanical part, to implement a flexible design.

In other words, an antenna form in the embodiment of this application is not limited to a printed form, and a metal structure or a combination of the metal structure and the printed form may also be used. In addition, a conformal design in a new process or the like may be used.

Figure 5:
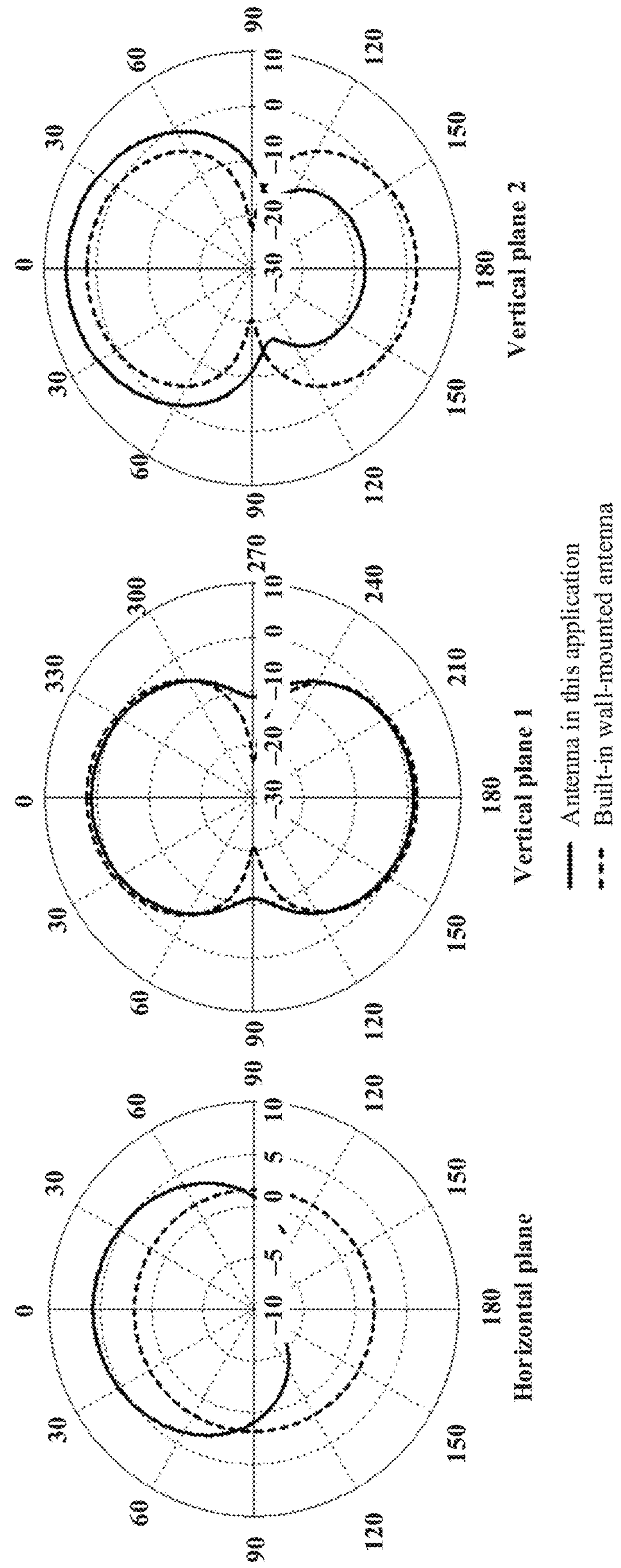
FIG. 5 is a 2D direction diagram of an antenna according to an embodiment of this application.

In the embodiment of this application, for example, compared with an existing commonly used 2.4G small-sized built-in wall-mounted antenna, a width of a new antenna needs to be increased by 8 mm in design. Therefore, the new antenna may implement a relatively good high-gain feature, reach a specification equivalent to that of an external antenna in a main radiation direction, and improve a wall penetration capability in a specific coverage direction compared with a common built-in antenna. FIG. 5 is a 2D direction diagram of the antenna according to the embodiment of this application.

It should be noted that the antenna in the technical solutions is applicable to a radio field in which an antenna is needed to output or receive an electromagnetic wave signal, and an operating frequency of the antenna may be correspondingly reduced according to a requirement, to implement an optimal matching design.

What is claimed is:

1. An antenna, comprising:

a radiating element, a reflecting element, and a radio frequency coaxial cable, wherein the radiating element and the reflecting element are located on a same plane, and the radiating element is connected to the radio frequency coaxial cable;

wherein the radiating element comprises an upper radiation arm, a lower radiation arm, and a balun, wherein the upper radiation arm and the lower radiation arm form an L-shaped longitudinal cabling structure or a local snake-shaped structure, and wherein the upper radiation arm and the lower radiation arm are connected to the balun;

wherein the reflecting element is of a comb structure, the comb structure comprises at least two comb teeth, sizes of all the comb teeth are the same, intervals between every two adjacent comb teeth are the same, and a comb-like opening face of the reflecting element is opposite to the radiating element;

wherein the radio frequency coaxial cable is configured to receive a radio frequency signal;

wherein the radiating element is configured to radiate the radio frequency signal to obtain a first radiation signal and a second radiation signal, and the first radiation signal and the second radiation signal have different directions;

wherein the first radiation signal is reflected by the at least two comb teeth to obtain a reflection signal, and a direction of the reflection signal is the same as the direction of the second radiation signal;

wherein the second radiation signal is coherently superimposed with the reflection signal to output a superimposed signal; and wherein the antenna includes a built-in antenna of a terminal.

2. The antenna according to claim 1, wherein every two adjacent comb teeth have a same length and a same width.

3. The antenna according to claim 2, wherein a width of each comb tooth ranges from $\lambda/20$ to $\lambda/8$, wherein an interval between the radiating element and the reflecting element ranges from $\lambda/20$ to $\lambda/8$, and wherein $\lambda$ is a wavelength of the radio frequency signal.

4. The antenna according to claim 3, wherein a phase of the superimposed signal is $2n\pi = n + 2\times d\times(2\pi/\lambda) + \Theta$, n is an integer greater than 0, d is the interval between the reflecting element and the radiating element, and Θ is a compensation phase generated by the comb structure.

5. The antenna according to claim 1, wherein the radiating element comprises a via, and wherein the radio frequency coaxial cable passes through the radiating element through the via.

6. The antenna according to claim 5, wherein the radio frequency coaxial cable perpendicularly passes through the radiating element through the via.

7. The antenna according to claim 5, wherein the via is located in the upper radiation arm or the lower radiation arm of the radiating element.

8. The antenna according to claim 7, wherein if the via is located in the upper radiation arm, the radio frequency coaxial cable comprises an inner conductor, an outer conductor, and an insulating medium;

wherein the outer conductor passes through the via and is connected to the upper radiation arm, and the inner conductor and the insulating medium pass through the via and are bent; and wherein the inner conductor is connected to the upper radiation arm, and the insulating medium insulates the inner conductor from contacting the lower radiation arm.

9. The antenna according to claim 1, wherein the upper radiation arm and the lower radiation arm are symmetrically connected to the balun.

10. The antenna according to claim 1, wherein shapes of the upper radiation arm and the lower radiation arm are symmetrical or asymmetrical.

11. The antenna according to claim 1, wherein the radiating element and the reflecting element are carried on a dielectric plate to form an integrally formed structure.

12. The antenna according to claim 1, wherein if the radiating element is made of a metal material, the reflecting element is carried on a dielectric plate.

13. The antenna according to claim 1, wherein if the reflecting element is made of a metal material, the radiating element is carried on a dielectric plate.

14. The antenna according to claim 1, wherein the reflecting element is carried on a circuit board, wherein the radiating element is carried on a dielectric plate, and wherein the reflecting element and the radiating element are connected through installation.

15. The antenna according to claim 1, wherein the terminal is an Optical Network Terminal (ONT).

16. A terminal, comprising:

a built-in antenna, wherein the built-in antenna comprises a radiating element;

a reflecting element; and a radio frequency coaxial cable;

wherein the radiating element and the reflecting element are located on a same plane, and the radiating element is connected to the radio frequency coaxial cable;

wherein the radiating element comprises an upper radiation arm, a lower radiation arm, and a balun, wherein the upper radiation arm and the lower radiation arm form an L-shaped longitudinal cabling structure or a local snake-shaped structure, and wherein the upper radiation arm and the lower radiation arm are connected to the balun;

wherein the reflecting element is of a comb structure, the comb structure comprises at least two comb teeth, sizes of all the comb teeth are the same, intervals between every two adjacent comb teeth are the same, and a comb-like opening face of the reflecting element is opposite to the radiating element;

wherein the radio frequency coaxial cable is configured to receive a radio frequency signal;

wherein the radiating element is configured to radiate the radio frequency signal, to obtain a first radiation signal and a second radiation signal, and the first radiation signal and the second radiation signal have different directions;

wherein the first radiation signal is reflected by the at least two comb teeth, to obtain a reflection signal, and a direction of the reflection signal is the same as the direction of the second radiation signal; and wherein the second radiation signal is coherently superimposed with the reflection signal, to output a superimposed signal.

17. The terminal according to claim 16, wherein every two adjacent comb teeth have a same length and a same width.

18. The terminal according to claim 17, wherein a width of each comb tooth ranges from $\lambda/20$ to $\lambda/8$, wherein an interval between the radiating element and the reflecting element ranges from $\lambda/20$ to $\lambda/8$, and wherein $\lambda$ is a wavelength of the radio frequency signal.

19. The terminal according to claim 18, wherein a phase of the superimposed signal is $2n\pi=n+2\times d\times(2\pi/\lambda)+\Theta$, n is an integer greater than 0, d is the interval between the reflecting element and the radiating element, and Θ is a compensation phase generated by the comb structure.

20. The terminal according to claim 16, wherein the radiating element comprises a via, and wherein the radio frequency coaxial cable passes through the radiating element through the via.

* * * * *